US012602768B2

(12) United States Patent
Gao et al.

(10) Patent No.: US 12,602,768 B2
(45) Date of Patent: Apr. 14, 2026

(54) SURFACE DEFECT DETECTION MODEL TRAINING METHOD, AND SURFACE DEFECT DETECTION METHOD AND SYSTEM

(71) Applicant: OPT MACHINE VISION TECH CO., LTD., Dongguan (CN)

(72) Inventors: Hongchao Gao, Dongguan (CN); Shenglin Lu, Dongguan (CN)

(73) Assignee: OPT MACHINE VISION TECH CO., LTD., Dongguan (CN)

( * ) Notice: Subject to any disclaimer, the term of this patent is extended or adjusted under 35 U.S.C. 154(b) by 274 days.

(21) Appl. No.: 18/283,372

(22) PCT Filed: May 17, 2022

(86) PCT No.: PCT/CN2022/093278
§ 371 (c)(1),
(2) Date: Sep. 21, 2023

(87) PCT Pub. No.: WO2022/242631
PCT Pub. Date: Nov. 24, 2022

(65) Prior Publication Data
US 2024/0169510 A1     May 23, 2024

(30) Foreign Application Priority Data

May 19, 2021     (CN) .......................... 202110548337.6

(51) Int. Cl.
*G06T 7/00*       (2017.01)
*G06V 10/44*      (2022.01)
(Continued)

(52) U.S. Cl.
CPC ............ *G06T 7/0008* (2013.01); *G06V 10/44* (2022.01); *G06V 10/761* (2022.01);
(Continued)

(58) Field of Classification Search
None
See application file for complete search history.

(56) References Cited

U.S. PATENT DOCUMENTS 10,360,692 B2 *  7/2019  Voyer ........................ G06T 7/73
11,544,628 B2 *  1/2023  Mitarai .................. G06N 20/00
(Continued)

FOREIGN PATENT DOCUMENTS

CN       111640091 A       9/2020
CN       112001903 A       11/2020
CN       113222950 A       8/2021

OTHER PUBLICATIONS

Yu et al., "Joint Feature and Label Adversarial Network for Wafer Map Defect Recognition," IEEE Transactions On Automation Science and Engineering, vol. 18, No. 3, Jul. 2021 (Year: 2021).*
(Continued)

*Primary Examiner* — Soo Shin
(74) *Attorney, Agent, or Firm* — Yue (Robert) Xu; Apex Attorneys at Law, LLP

(57)           ABSTRACT

A method for training a surface defect detection model as well as a method and a system for detecting a surface defect are provided. The method and the system for detecting a surface defect adopt the trained surface defect detection model. The method for training a surface defect detection model includes acquiring a normal image of a product and an external image that is irrelevant to the product and inputting the normal image and the external image into a deep neural network-based surface defect detection model, and training the deep neural network-based surface defect detection model to obtain the trained surface defect detection model. The normal image represents the product surface of no defect on this surface.

5 Claims, 3 Drawing Sheets

● Normal image
★ External image

(51) Int. Cl.
  G06V 10/74 (2022.01)
  G06V 10/771 (2022.01)
(52) U.S. Cl.
  CPC .. G06V 10/771 (2022.01); *G06T 2207/20081* (2013.01); *G06T 2207/20084* (2013.01)

(56) References Cited

U.S. PATENT DOCUMENTS

| | | | | |
|---|---|---|---|---|
| 12,394,036 | B2 * | 8/2025 | Nogami .................... | G06F 3/14 |
| 2015/0131895 | A1 * | 5/2015 | Jensen ................. | G06T 7/0004 |
| | | | | 382/152 |
| 2019/0304077 | A1 * | 10/2019 | Wang ..................... | G06V 20/46 |
| 2021/0364447 | A1 * | 11/2021 | Naruse ................... | G06T 7/001 |
| 2022/0214243 | A1 * | 7/2022 | Li ........................... | G01M 3/38 |
| 2023/0196096 | A1 * | 6/2023 | Milne .................. | G06F 18/214 |
| | | | | 706/25 |
| 2024/0104904 | A1 * | 3/2024 | Du ....................... | G06V 10/774 |
| 2024/0160194 | A1 * | 5/2024 | Bakhshmand ......... | G06N 20/10 |
| 2024/0402098 | A1 * | 12/2024 | Allman ............. | G06F 18/23213 |

OTHER PUBLICATIONS

International Search Report for PCT/CN2022/093278 mailed Jul. 22, 2022, ISA/CN.

* cited by examiner

| | |
|---|---|
| Acquire a normal image of a product and an external image that is irrelevant to the product | S101 |

| | |
|---|---|
| Input the normal image and the external image into a deep neural network-based surface defect detection model, and train the deep neural network-based surface defect detection model to obtain the trained surface defect detection model | S102 |

Figure 1

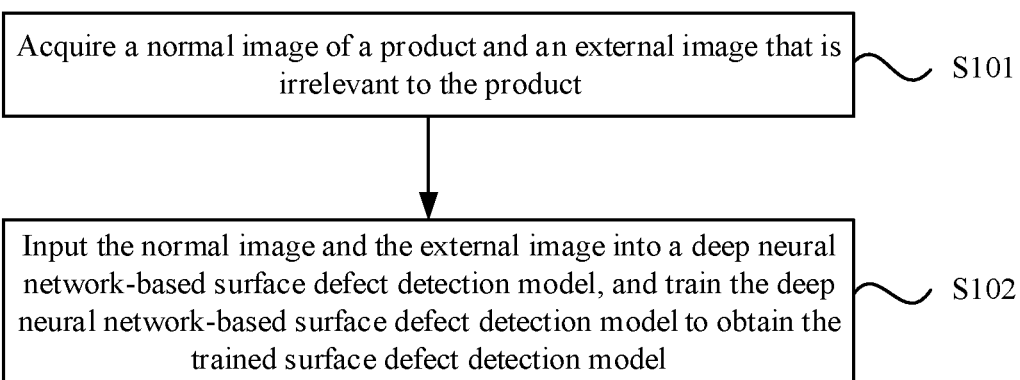

● Normal image

✦ External image

Figure 2

Acquire an image of a to-be-examined target product          S301

Input the captured image of the target product into the trained surface defect detection model to perform defect detection on a surface of the target product, and locate, if a defect is detected, the detected defect          S302

401

402

Image capturing module

Defect detecting module

1

SURFACE DEFECT DETECTION MODEL TRAINING METHOD, AND SURFACE DEFECT DETECTION METHOD AND SYSTEM

The present application is a national phase application of PCT international patent application No. PCT/CN2022/093278, filed on May 17, 2022 which claims priority to Chinese Patent Application No. 202110548337.6, titled "METHOD FOR TRAINING SURFACE DEFECT DETECTION MODEL, METHOD AND SYSTEM FOR DETECTING SURFACE DEFECT", filed on May 19, 2021 with the China National Intellectual Property Administration, both of which are incorporated herein by reference in their entireties.

FIELD

The present disclosure relates to the technical field of machine vision, and in particular to a method for training a surface defect detection model, a method and a system for detecting a surface defect.

BACKGROUND

With the rapid development of industry, users pay increasing attention to the quality of products and put forward increasingly rigorous demands. Some defects are always in a product in the production process, and these defects are random to some extent, that is, different in category, shape and size. Hence, the detection of a surface defect in the product, as one of the most significant processes in the production process, directly related to the product quality and user experience.

Previously, manufacturers mainly detected surface defects of a product manually, that is, manually visually observed whether there were defects on a surface of the product, and then determined, based on empirical knowledge, which category the detected defects belonged to. This solution, although simple, is easily affected by subjective consciousness of personnel, time-consuming and laborious, results in detection accuracy, and therefore is gradually abandoned by major manufacturers. Later, detection of surface defects based on deep learning was proposed, and the core of which is that machine vision instead of the human vision participates in inspection of the product quality. The detection based on deep learning, because it can not only reduce labor costs and prevent determination differences caused by human subjective consciousness and visual fatigue but also improve detection efficiency and accuracy as well as reduce detection errors, has been quickly applied to the detection of surface defects of products since its proposal, and has become the development trend of manufacturing industry today.

At present, product images representing defects and product images representing no defect are collected in advance as data for training the defect detection model for the deep learning-based detection. However, in the actual application, it is more challenged to acquire the product images representing defects because the number of product images representing defects is relatively few compared to the product images representing no defect. In contrast, there may be only one product image representing defects among a large number of product images representing no defect, resulting in high cost of the collection of the product image representing no defect and even failure to collect the product images representing no defect. Consequently, the number of the product images representing defects is insufficient to train the defect detection model. In addition, a reasonable threshold representing whether the product image represents defects or not is acquired through multiple experiments in order to train the defect detection model. This directly leads to the fact that the stability of the trained defect detection model varies with the threshold, resulting in poor reliability.

Therefore, it is necessary to improve the existing detection of the surface defect based on deep learning in order to solve the above problems.

The above information is described as background information merely to facilitate the understanding of the present disclosure, and is not a determination or admission that any of the above might be available as prior art with respect to the present disclosure.

SUMMARY

A method for training a surface defect detection model, as well as a method and a system for detecting a surface defect are provided according to the present disclosure, so as to remedy the deficiencies in the existing technology.

According to a first aspect of embodiments of the present disclosure, a method for training a surface defect detection model is provided.

According to the first aspect of embodiments of the present disclosure, the method in an embodiment includes: acquiring a normal image of a product and an external image that is irrelevant to the product; and inputting the normal image and the external image into a deep neural network-based surface defect detection model, and training the deep neural network-based surface defect detection model to obtain the trained surface defect detection model.

In an embodiment, the inputting the normal image and the external image into a deep neural network-based surface defect detection model, and training the deep neural network-based surface defect detection model to obtain the trained surface defect detection model includes: inputting the normal image and the external image into the deep neural network-based surface defect detection model; performing feature extraction on the normal image utilizing the deep neural network-based surface defect detection model to obtain a feature map of the normal image, performing feature extraction on the external image utilizing the deep neural network-based surface defect detection model to obtain a feature map of the external image, mapping the feature map of the normal image to obtain a distance matrix of the normal image, and mapping the feature map of the external image to obtain a distance matrix of the external image; setting a loss function based on the distance matrix of the normal image and the distance matrix of the external image; and training the deep neural network-based surface defect detection model utilizing the loss function, to obtain the trained surface defect detection model.

In an embodiment, the loss function corresponding to a training process is expressed as:

$$loss_i = \frac{1}{W \times H}\left(\sum_{i=1,j=1}^{W,H}(1 - Y_i)(1 - \exp(-F_{i,j})) + \sum_{i=1,j=1}^{W,H}(Y_i)(F_{i,j})\right);$$

where loss denotes the loss function, W denotes a width of the distance matrix, H denotes a height of the distance matrix, $Y_i$ denotes a tag of an i-th image, $Y_i=1$ represents a normal image, $Y_i=0$ represents an abnormal image, $F_{i,j}$ denotes a value at a position (i, j) in the distance matrix.

According to a second aspect of embodiments of the present disclosure, a method for detecting a surface defect is provided.

According to the second aspect of embodiments of the present disclosure, the method in an embodiment is performed by utilizing the surface defect detection model trained by the above method for training a surface defect detection model, and the method for detecting a surface defect includes: capturing an image of a to-be-examined target product; and inputting the captured image of the target product into the surface defect detection model to perform defect detection on a surface of the target product and locating, if a defect is detected, the detected defect.

In an embodiment, the inputting the captured image of the target product into the surface defect detection model to perform defect detection on the surface of the target product includes: inputting the captured image of the target product into the surface defect detection model; performing feature extraction on the image of the target product through the surface defect detection model, to obtain a feature map $F\_w,h,c$ of the image of the target product; mapping the feature map $F$ about the target product to obtain a distance matrix $D_{i,j}=\|F_{w,h,:}\|_2$ about the target product; mapping the feature map $F$ about the target product to obtain a distance $D=\Sigma_{w,h}\|F_{w,h,:}\|_2/W\times H$ from the target product to a normal product; determining whether a distance median about the target product is within a preset range; determining that there is no defect on the surface of the target product if it is determined that the distance median about the target product is within the preset range; and determining that there is a defect on the surface of the target product and locating the detected defect if it is determined that the distance median about the target product is not within the preset range.

In an embodiment, the locating the detected defect includes: locating the detected defect based on the distance matrix; determining, for each position <i, j> in the distance matrix about the target product, whether a distance value at the position <i, j> is within the preset range; determining that the detected defect is not in an image block corresponding to the position <i, j> on the surface of the target product if it is determined that the distance value at the position <i, j> is within the preset range; and determining that the detected defect is in the image block corresponding to the position <i, j> on the surface of the target product if it is determined that the distance value at the position <i, j> is not within the preset range.

According to a third aspect of embodiments of the present disclosure, a system for training a surface defect detection model is provided.

According to the third aspect of embodiments of the present disclosure, the system for training a surface defect detection model in an embodiment includes an image acquiring module and a model training module. The image acquiring module is configured to acquire a normal image of a product and an external image that is irrelevant to the product. The model training module is configured to input the normal image and the external image into a deep neural network-based surface defect detection model, and train the deep neural network-based surface defect detection model to obtain the trained surface defect detection model.

In an embodiment, the model training module is configured to: input the normal image and the external image into the deep neural network-based surface defect detection model; perform feature extraction on the normal image utilizing the deep neural network-based surface defect detection model to obtain a feature map of the normal image, perform the feature extraction on the external image utilizing the deep neural network-based surface defect detection model to obtain a feature map of the external image, map the feature map of the normal image to obtain a distance matrix of the normal image, and map the feature map of the external image to obtain a distance matrix of the external image; set a loss function based on the distance matrix of the normal image and the distance matrix of the external image; and train the deep neural network-based surface defect detection model utilizing the loss function, to obtain the trained surface defect detection model.

In an embodiment, the loss function corresponding to the training process is expresses as:

$$\text{loss}_i = \frac{1}{W \times H}\left(\sum_{i=1,j=1}^{W,H}(1-Y_i)(1-\exp(-F_{i,j})) + \sum_{i=1,j=1}^{W,H}(Y_i)(F_{i,j})\right);$$

where $\text{loss}_i$ denotes the loss function, W denotes a width of the distance matrix, H denotes a height of the distance matrix, $Y_i$ denotes a tag of an i-th image, $Y_i=1$ represents a normal image, $Y_i=0$ represents an abnormal image, $F_{i,j}$ denotes a value at a position (i, j) in the distance matrix.

According to a fourth aspect of embodiments of the present disclosure, a system for detecting a surface defect is provided.

According to the fourth aspect of embodiments of the present disclosure, the system for detecting a surface defect utilizes the surface defect detection model trained by the method in the first aspect. The system includes an image capturing module and a defect detecting module. The image capturing module is configured to capture an image of a to-be-examined target product. The defect detecting module is configured to input the captured image of the target product into the surface defect detection model to perform defect detection on a surface of the target product, and locate, if a defect is detected, the detected defect.

In an embodiment, the defect detecting module is configured to: input the captured image of the target product into the surface defect detection model; perform feature extraction on the image of the target product through the surface defect detection model, to obtain a feature map $F\_w,h,c$ of the image of the target product; map the feature map $F$ about the target product to obtain a distance matrix $D_{i,j}=\|F_{w,h,:}\|_2$ about the target product; map the feature map $F$ about the target product to obtain a distance $D=\Sigma_{w,h}\|F_{w,h,:}\|_2/W\times H$ from the target product to a normal product; determine whether a distance median about the target product is within a preset range; determine that there is no defect on the surface of the target product in a case that the distance median about the target product is within the preset range; and determine that there is a defect on the surface of the target product and locate the found defect in a case that the distance median about the target product is not within the preset range.

In an embodiment, the defect detecting module is further configured to: locate the found defect based on the distance matrix after determining that there is the defect on the surface of the target product; determine, for each position <i, j> in the distance matrix about the target product, whether a distance value at the position <i, j> is within the preset range; determine that an image block corresponding to the position <i, j> on the surface of the target product has no defect in a case that the distance value at the position <i, j> is within the preset range; and determine that the image block corresponding to the position <i, j> on the surface of the target product has a defect in a case that the distance value at the position <i, j> is not within the preset range.

Compared to the conventional technology, the embodiments of the present disclosure have the beneficial effects as follows.

With the method for training a surface defect detection model as well as the method and the system for detecting a surface defect according to the present disclosure, the product image representing defects is unnecessarily captured. Instead, the surface defect detection model for use can be trained based on only the normal image of the product and the external image that is irrelevant to the product. Therefore, the problem of considerable difficulties and high cost in collecting product images representing defects as well as enormous difficulties in setting the threshold for determining wherein there is a defect or not. In addition, the model trained with this method has high reliability and therefore is suitable for large-scale promotion and application.

BRIEF DESCRIPTION OF THE DRAWINGS

In order to more clearly explain the technical solutions in the embodiments of the present disclosure or in the conventional technology, the drawings used in the description of the embodiments or the conventional technology are briefly introduced hereinafter. It is apparent that the drawings in the following description illustrate only some embodiments of the present disclosure. Other drawings may be obtained by those skilled in the art based on the provided drawings without creative efforts.

FIG. 1 is a schematic flow chart illustrating a method for training a surface defect detection model according to a first embodiment of the present disclosure;

FIG. 2 is a schematic diagram illustrating a range of distance values in distance matrices obtained by mapping the feature maps of external image and normal image according to a first embodiment of the present disclosure;

DETAILED DESCRIPTION

Figure 3:
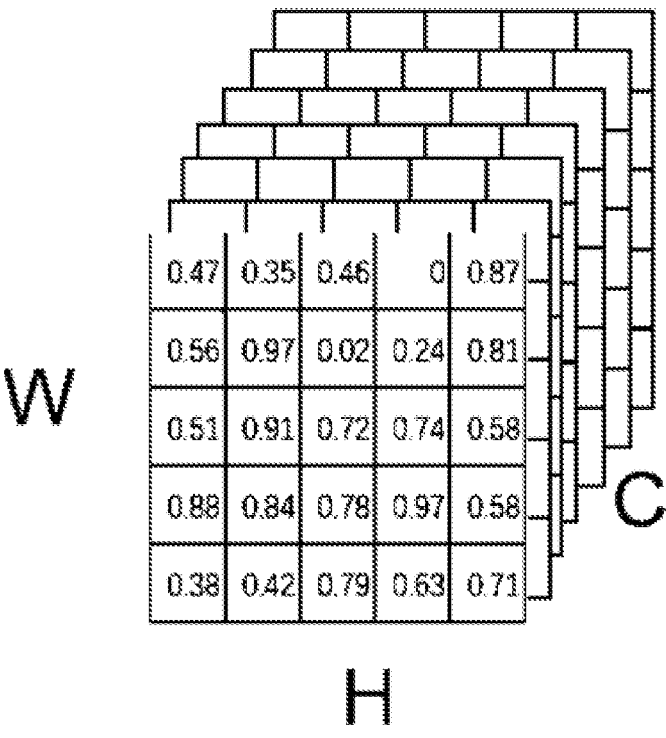
FIG. 3 is a schematic diagram illustrating a distance matrix according to the first embodiment of the present disclosure.

The technical solutions in the embodiments of the present disclosure will be described clearly and completely hereinafter in combination with the drawings in the embodiments of the disclosure, so that the purpose, features and advantages of the present disclosure are clear and understandable. It is apparent that the described embodiments are only part rather than all of the embodiments. Based on the embodiments of the present disclosure, all other embodiments obtained by those skilled in the art without creative efforts fall within the protection scope of the present disclosure.

In the description of the present disclosure, it should be understood that a component defined as "connected" to another component may be directly or indirectly connected to the other component. A component defined as "arranged on" another component may be arranged directly or indirectly on the other component.

In addition, the terms "long", "short", "inner", "outer", etc. indicate the orientation or positional relationship based on the orientation or positional relationship shown in the drawings, for only the convenience of describing the present disclosure rather than indicating or implying the described device or element must have this particular orientation and operate in a particular orientation configuration, and therefore should not be construed as a limitation on the present disclosure.

Hereinafter, the technical solutions of the present disclosure will be further described by embodiments with reference to the drawings.

FIRST EMBODIMENT

In view of the defects in the existing detection of surface defects, it is desirable that a feasible and practical method for detecting a surface defect be proposed form active research and innovation based on years of rich practical experience and professional knowledge in the art in combination with the application of academic theory. The present invention with real practical value is finally created after continuous research, design as well as repeated trials and improvements.

Reference is made to FIG. 1, which is a schematic flow chart illustrating a method for training a surface defect detection model according to the first embodiment of the present disclosure. The method is applicable to a scenario for determining whether there is a defect on a surface of a product. This method is performed by a system for training the surface defect detection model. This system is implemented by software and/or hardware, and is integrated inside a detection device. As shown in FIG. 1, the method for training the surface defect detection model includes the following steps S101 to S102.

In S101, a normal image of a product and an external image that is irrelevant to the product are acquired.

It should be noted that the detection of a surface defect in this embodiment is based on deep learning. The main model of the deep learning is a convolutional neural network model. Since the number of categories in the training set of the neural network model should be greater than or equal to 2, images in another category are required in addition to the normal images in which no defect exists on the product surface. As explained in the BACKGROUND part, however, it is less likely to acquire images representing defects in the actual process of industrial production i.e., a majority among the acquired product images are normal images representing the product surface of no defect. Therefore, in the present disclosure, the surface defect detection model is created and trained based on only a large number of normal images in case of a few of product images representing defects or even no product image representing defects. In this embodiment, the normal product images representing no defect fall into one category and the external images irrelevant to the product fall into a different category, in order to satisfy the requirements on the number of categories in the training set of the neural network model.

This embodiment is not only for images representing regular textures. The object to which the method is applied may include any industrial images, such as images representing surfaces of lithium batteries, images representing surfaces of circuit boards, and ideally images representing surfaces of products in a product line.

In S102, the normal image and the external image are inputted into a deep neural network-based surface defect detection model, and the deep neural network-based surface defect detection model is trained to obtain the trained surface defect detection model.

It should be noted that, features of normal images of the product are acquired from images representing no defect in this embodiment, so as measure a degree of abnormality of a to-be-examined unknown image, that is, to determine whether the unknown image represents a defect or not.

In an embodiment, step S102 includes the following details. The normal image and the external image are inputted into the deep neural network-based surface defect detection model. Feature extraction is performed on the normal image utilizing the deep neural network-based surface defect detection model to obtain a feature map of the normal image, and the feature extraction is performed on the external image utilizing the deep neural network-based surface defect detection model to obtain a feature map of the external image. Further, a distance matrix of the normal image is acquired by mapping the feature map of the normal image and a distance matrix of the external image is acquired by mapping the feature map of the external image. A loss function is set according to the distance matrix of the normal image and the distance matrix of the external image. The deep neural network-based surface defect detection model is trained utilizing the loss function, to obtain the trained surface defect detection model.

In this embodiment, the loss function corresponding to the training process is expresses as:

$$\text{loss}_i = \frac{1}{W \times H} \left( \sum_{i=1, j=1}^{W, H} (1 - Y_i)(1 - \exp(-F_{i,j})) + \sum_{i=1, j=1}^{W, H} (Y_i)(F_{i,j}) \right);$$

where $\text{loss}_i$ denotes the loss function, W denotes a width of the distance matrix, H denotes a height of the distance matrix, $Y_i$ denotes a tag of an i-th image, $Y_i=1$ represents a normal image, $Y_i=0$ represents an abnormal image, $F_{i,j}$ denotes a value at a position of (i, j) in the distance matrix.

It should be noted that in this embodiment, after the feature map of the normal image of the product is obtained by extracting the feature of the normal image of the product through the deep neural network-based surface defect detection model, all distance values in the distance matrix obtained by mapping the feature map of the normal image are enclosed within a sphere with o as its center (where coordinates of the center are (0, 0, 0) by default) and r (i.e., a threshold) as its radius. The radius r depends on the distance values in the distance matrix obtained by mapping the feature map of the normal image of the product. The distance values are normalized to be from 0 to 1. The threshold is generally selected from 0.1 to 0.5, and has little effect on the result. In contrast, after the feature map of the external image that is irrelevant to the product is obtained by extracting the feature of the external image through the deep neural network-based surface defect detection model, all distance values in the distance matrix obtained by mapping the feature map of the external image are outside the sphere with o as the center and r as the radius, as shown in FIG. 2. In other words, the distance of the normal image to the center (origin) is far less than that of the abnormal image (images representing the produce representing defects).

It should be further noted that in this embodiment, for each image I in a certain size, a feature map is obtained with the deep neural network-based surface defect detection model, and then a corresponding distance matrix $D_{i,j}$ is obtained by mapping the feature map F_w,h,c (where the feature map F is represented by three dimensions, namely a width (W), height (H) and a channel (C) as shown in FIG. 3). Since only the convolution operation is performed, the distance matrix $D_{i,j}$ positionally corresponds to the original image I. That is, the value at a position <i, j> in the distance matrix $D_{i,j}$ represents the distance from the corresponding position in the original image I to the center.

The distance representations corresponding to the same channel are combined to obtain a two-dimensional distance representation, for locating a defect in the image representing defects. The two-dimensional distance matrix is converted into a one-dimensional distance representation D, for distinguishing a normal image and an image representing defects. That is, the distance D is used as the basis for determining whether the to-be-examined image is abnormal or not. The distance D is expressed as follows.

$$D = \Sigma_{w,h} \|F_{w,h,:}\|_2 / W \times H.$$

With the method for training the surface defect detection model according to the present disclosure, the product image representing defects is unnecessarily captured. Instead, the surface defect detection model for use can be trained based on only the normal image of the product and the external image that is irrelevant to the producer. Therefore, the problem of considerable difficulties and high cost in collecting product images representing defects as well as enormous difficulties in setting the threshold for determining whether there is a defect or not. In addition, the model trained with this method has high reliability and therefore is suitable for large-scale promotion and application.

Second Embodiment

Figure 4:
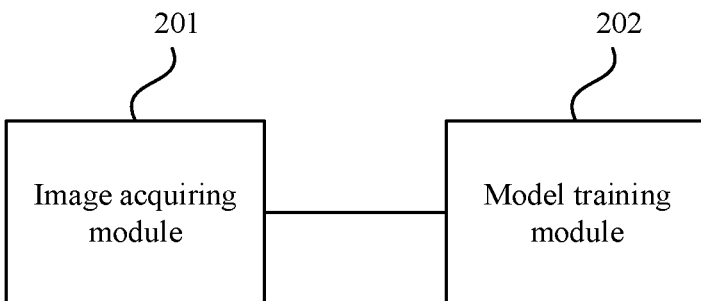
FIG. 4 is a schematic diagram illustrating functional modules of a system for training a surface defect detection model according to a second embodiment of the present disclosure.

Reference is made to FIG. 4, which is a schematic diagram illustrating functional modules of a system for training a surface defect detection model according to a second embodiment of the present disclosure. This system is configured to implement the method for training a surface defect detection model according to the embodiments of the present disclosure. The system includes an image acquiring module 201 and a model training module 202.

The image acquiring module 201 is configured to acquire a normal image of a product and an external image that is irrelevant to the product.

The model training module 202 is configured to input the normal image and the external image into a deep neural network-based surface defect detection model, and train the deep neural network-based surface defect detection model to obtain the trained surface defect detection model.

In this embodiment, the model training module 202 is configured to: input the normal image and the external image into the deep neural network-based surface defect detection model; perform feature extraction on the normal image utilizing the deep neural network-based surface defect detection model to obtain a feature map of the normal image, perform the feature extraction on the external image utilizing the deep neural network-based surface defect detection model to obtain a feature map of the external image, map the feature map of the normal image to obtain a distance matrix of the normal image, and map the feature map of the external image to obtain a distance matrix of the external image; set a loss function based on the distance matrix of the normal image and the distance matrix of the external image; and train the deep neural network-based surface defect detection model utilizing the loss function, to obtain the trained surface defect detection model.

In this embodiment, the loss function corresponding to the training process is expresses as:

$$loss_i = \frac{1}{W \times H}\left(\sum_{i=1,j=1}^{W,H}(1-Y_i)(1-\exp(-F_{i,j})) + \sum_{i=1,j=1}^{W,H}(Y_i)(F_{i,j})\right);$$

where loss denotes the loss function, W denotes a width of the distance matrix, H denotes a height of the distance matrix, $Y_i$ denotes a tag of an i-th image, $Y_i=1$ represents a normal image, $Y_i=0$ represents an abnormal image, $F_{i,j}$ denotes a value at a position (i, j) in the distance matrix.

With the system for training the surface defect detection model according to the present disclosure, the product image representing defects is unnecessarily captured. Instead, the surface defect detection model for use can be trained based on only the normal image of the product and the external image that is irrelevant to the product. Therefore, the problem of considerable difficulties and high cost in collecting product images representing defects as well as enormous difficulties in setting the threshold for determining wherein there is a defect or not. In addition, the model trained with this method has high reliability and therefore is suitable for large-scale promotion and application.

This system for training the surface defect detection model is configured to perform the method for training the surface defect detection model according to embodiments of the present disclosure, and thus has corresponding functional modules and brings the same beneficial effects as the method.

Third Embodiment

Figure 5:
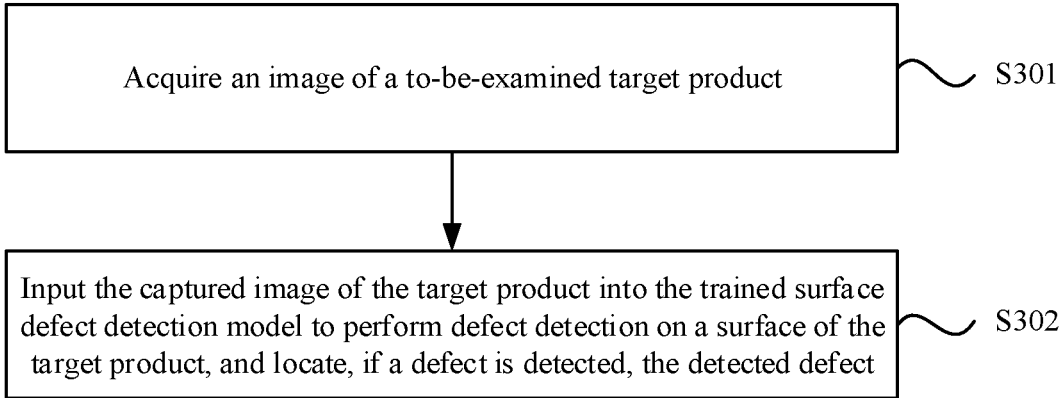
FIG. 5 is a schematic flow chart illustrating a method for detecting a surface defect according to a third embodiment of the present disclosure.

Reference is made to FIG. 5, which is a schematic flow chart illustrating a method for detecting a surface defect according to an embodiment of the present disclosure. This method is implemented by a surface defect detection system. Such system is implemented by software and/or hardware, and is integrated inside a detection device. This method utilizes the surface defect detection model trained by the method in the first embodiment. As shown in FIG. 5, the method for detecting a surface defect includes the following steps S301 to S302.

In S301, an image of a to-be-examined target product is captured.

In S302, the captured image of the target product is inputted into the surface defect detection model, to perform defect detection on a surface of the target product, and if a defect is detected, detected defect is located.

In this embodiment, step S302 includes the following details. The captured image of the target product is inputted into the surface defect detection model. Feature extraction is performed on the image of the target product through the surface defect detection model, to obtain a feature map F_w,h,c of the image of the target product. A distance matrix $D_{i,j}=\|F_{w,h,:}\|_2$ about the target product is obtained by mapping the feature map F about the target product. A distance $D=\Sigma_{w,h}\|F_{w,h,:}\|_2/W\times H$ from the target product to a normal product is obtained by mapping the feature map F of the target product. It is determined whether a distance median about the target product is within a preset range. It is determined that there is no defect on the surface of the target product in a case that the distance median about the target product is within the preset range. It is determined that there is a defect on the surface of the target product the found defect is located in a case that the distance median about the target product is not within the preset range.

In this embodiment, after determined that there is a defect on the surface of the target product, the found defect is located as follows. The defect is located based on the distance matrix. It is determined, for each position <i, j> in the distance matrix about the target product, whether a distance value at the position <i, j> is within the preset range. It is determined that an image block corresponding to the position <i, j> on the surface of the target product has no defect in a case that the distance value at the position <i, j> is within the preset range. It is determined that the image block corresponding to the position <i, j> on the surface of the target product has a defect in a case that the distance value at the position <i, j> is not within the preset range.

It should be noted that in this embodiment, whether there is a defect on the surface of the target product is determined by determining whether the distance value at the position in the distance matrix about the target product is within the preset range [0, r]. Specifically, in a case that the distance values $D_{i,j}$ at all positions in the distance matrix about the target product are within the preset range [0, r], it is determined that the surface of the target product has no defect. In a case that the distance value $D_{i,j}$ at a position in the distance matrix about the target product is outside the preset range [0, r], it is determined that the surface of the target product has a defect.

With the method for detecting a surface defect according to the present disclosure, the image of the to-be-examined target product is inputted into the surface defect detection model trained which in trained based on the normal image of the product and the external image that is irrelevant to the product. In this way, a product that is defective can be found effectively and accurately. Therefore, products of poor quality can be discovered timely during the production process, so as to improve the product yield.

Fourth Embodiment

Figure 6:
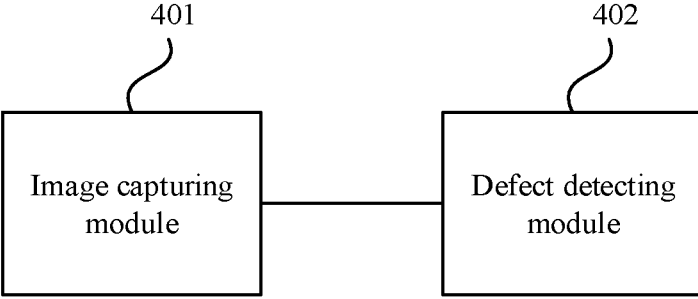
FIG. 6 is a schematic diagram illustrating functional modules of a system for detecting a surface defect according to a fourth embodiment of the present disclosure.

Reference is made to FIG. 6, which is a schematic diagram illustrating functional modules of a system for detecting a surface defect according to a fourth embodiment of the present disclosure. The system utilizes the surface defect detection model trained by the method in the first embodiment, and is configured to perform the method for detecting a surface defect in the embodiments of the present disclosure. This system includes an image capturing module 401 and a defect detecting module 402.

The image capturing module 401 is configured to capture an image of a to-be-examined target product.

The defect detecting module 402 is configured to input the captured image of the target product into the surface defect detection model to perform defect detection on a surface of the target product, and locate, if a defect is detected, the detected defect.

In this embodiment, the defect detecting module 402 is configured to: input the captured image of the target product into the surface defect detection model; perform feature extraction on the image of the target product through the surface defect detection model, to obtain a feature map F_w,h,c of the image of the target product; map the feature map F about the target product to obtain a distance matrix $D_{i,j}=\|F_{w,h,:}\|_2$ about the target product; map the feature map F about the target product to obtain a distance $D=\Sigma_{w,h}\|F_{w,h,:}\|_2/W\times H$ from the target product to a normal product;

determine whether a distance median about the target product is within a preset range; determine that there is no defect on the surface of the target product in a case that the distance median about the target product is within the preset range; and determine that there is a defect on the surface of the target product and locate the found defect in a case that the distance median about the target product is not within the preset range.

In an embodiment, the defect detecting module 402 is further configured to: locate the found defect based on the distance matrix after determining that there is the defect on the surface of the target product; determine, for each position <i, j> in the distance matrix about the target product, whether a distance value at the position <i, j> is within the preset range; determine that an image block corresponding to the position <i, j> on the surface of the target product has no defect in a case that the distance value at the position <i, j> is within the preset range; and determine that the image block corresponding to the position <i, j> on the surface of the target product has a defect in a case that the distance value at the position <i, j> is not within the preset range.

With the system for detecting a surface defect according to the present disclosure, the image of the to-be-examined target product is inputted into the surface defect detection model trained which in trained based on the normal image of the product and the external image that is irrelevant to the product. In this way, a product that is defective can be found effectively and accurately. Therefore, products of poor quality can be discovered timely during the production process, so as to improve the product yield.

This system for detecting a surface defect is configured to perform the method detecting a surface defect according to embodiments of the present disclosure, and thus has corresponding functional modules and brings the same beneficial effects as the method.

The foregoing embodiments hereto have been provided for purposes of illustration and description, and are not intended to be exhaustive or to limit the present disclosure. Individual elements or features of a particular embodiment are generally not limited to this particular embodiment. Where applicable, however, such elements or features are interchangeable and used in selected embodiments, even if not specifically shown or described. In many respects, the same elements or features may also be varied. Such variations are not to be regarded as a departure from the present disclosure, and all such modifications are intended to be included within the scope of the present disclosure.

Example embodiments are provided so that the present disclosure will be thorough, and will fully convey the scope to those skilled in the art. Numerous details such as examples of specific parts, devices and methods are set forth, in order to provide a thorough understanding of the embodiments of the present disclosure. It will be apparent to those skilled in the art that the example embodiments may be embodied in many different forms without the specific details, and that neither should be construed to limit the scope of the present disclosure. In some example embodiments, well-known processes, well-known device structures, and well-known technologies are not described in detail.

The terminology used herein is for the purpose of describing particular example embodiments only and no limitation is intended. As used herein, the singular forms "a" and "the" may be meant to include the plural forms as well, unless the context clearly indicates otherwise. The terms "comprising" and "having" are inclusive and thus specify the presence of stated features, integers, steps, operations, elements and/or components, but do not exclude the presence or additional presence of one or more other features, integers, steps, operations, elements, components and/or combinations thereof. The method steps, processes, and operations described herein are not to be construed as necessarily performed in the specific order discussed and illustrated, unless an order of performance is explicitly indicated. It should also be understood that additional or alternative steps may be employed.

An element or layer referred to as being "on," "coupled to", "connected to," or "linked to" another may be directly or in directly on, coupled to, connected to, or linked to the other. In contrast, an element or layer referred to as being "directly on", "directly coupled to", "directly connected to," or "directly linked to" may exclude the indirect manner. Other words (e.g., "between" versus "directly between," "adjacent" versus "directly adjacent," etc.) used to describe the relationship between elements should be interpreted in a similar manner. As used herein, the term "and/or" includes any and all combinations of one or more of the associated listed items. Although the terms first, second, third and the like are used herein to describe various elements, components, regions, layers and/or sections, these elements, components, regions, layers and/or sections are not limited by these terms. These terms are used to only distinguish one element, component, region or section from another. Terms such as "first," "second," and the like used herein do not imply a sequence or order unless clearly indicated in the context. Thus, a first element, component, region, layer or section discussed below could be described as a second element, component, region, layer or section without departing from the teachings of the example embodiments.

Spatially relative terms, such as "inside", "outside", "below", "beneath", "lower", "above", "upper", etc., may be used herein for convenience of description, to describe the relationship between one element or feature and one or more other elements or features as shown in the drawings. These spatially relative terms may be meant to include different orientations of the device in addition to the orientation shown in the drawings. For example, if the device in the drawings is reversed, the element described as "below" or "beneath" another element or feature would then be described as "above" the other element or feature instead. Therefore, the example term "below" may include both orientations of upward and downward. The device may be otherwise oriented (e.g., rotated through 90 degrees or oriented differently) and interpreted in terms of the spatially relative descriptions herein.

The invention claimed is:

1. A method for training a surface defect detection model, comprising:

acquiring a first image and a second image, wherein the first image corresponds to an image of a product; and inputting the first image and the second image into a deep neural network-based surface defect detection model and training the deep neural network-based surface defect detection model to obtain the trained surface defect detection model;

wherein the loss function corresponding to a training process is expressed as:

$$loss_i = \frac{1}{W \times H}\left(\sum_{i=1,j=1}^{W,H}(1 - Y_i)(1 - \exp(-F_{i,j})) + \sum_{i=1,j=1}^{W,H}(Y_i)(F_{i,j})\right);$$

wherein $loss_i$ denotes the loss function, W denotes a width of the distance matrix, H denotes a height of the distance matrix, $Y_i$ denotes a tag of an i-th image, $Y_i=1$ represents a first image, $Y_i=0$ represents an image not satisfying a predetermined threshold requirement, $F_{i,j}$ denotes a value at a position (i, j) in the distance matrix.

2. The method for training a surface defect detection model according to claim 1, wherein the inputting the first image and the second image into the deep neural network-based surface defect detection model and training the deep neural network-based surface defect detection model to obtain the trained surface defect detection model comprises:

inputting the first image and the second image into the deep neural network-based surface defect detection model;

performing feature extraction on the first image utilizing the deep neural network-based surface defect detection model to obtain a feature map of the first image, performing the feature extraction on the second image utilizing the deep neural network-based surface defect detection model to obtain a feature map of the second image, mapping the feature map of the first image to obtain a distance matrix of the first image, and mapping the feature map of the second image to obtain a distance matrix of the second image;

setting a loss function based on the distance matrix of the first image and the distance matrix of the second image; and training the deep neural network-based surface defect detection model utilizing the loss function, to obtain the trained surface defect detection model.

3. A method for detecting a surface defect, wherein the method is performed by utilizing the surface defect detection model trained with the method according to claim 1, and the method comprises:

capturing an image of a to-be-examined target product; and inputting the captured image of the target product into the surface defect detection model to perform defect detection on a surface of the target product; and locating, if a defect is detected, the detected defect.

4. The method for detecting surface defect according to claim 3, wherein the inputting the captured image of the target product into the surface defect detection model to perform defect detection on the surface of the target product comprises:

inputting the captured image of the target product into the surface defect detection model;

performing feature extraction on the image of the target product through the surface defect detection model, to obtain a feature map F_w,h,c of the image of the target product;

mapping the feature map F about the target product to obtain a distance matrix $D_{i,j}=\|F_{w,h,:}\|_2$ about the target product;

mapping the feature map F about the target product to obtain a distance $D=\Sigma_{w,h}\|F_{w,h,:}\|_2/W\times H$ from the target product to a normal product;

determining whether a distance median about the target product is within a preset range;

determining that there is no defect on the surface of the target product if it is determined that the distance median about the target product is within the preset range; and determining that there is a defect on the surface of the target product and locating the detected defect if it is determined that the distance median about the target product is not within the preset range.

5. The method for detecting a surface defect according to claim 4, wherein the locating the detected defect comprises:

locating the detected defect based on the distance matrix;

determining, for each position <i, j> in the distance matrix about the target product, whether a distance value at the position <i, j> is within the preset range;

determining that the detected defect is not in an image block corresponding to the position <i, j> on the surface of the target product if it is determined that the distance value at the position <i, j> is within the preset range; and determining that the detected defect is in the image block corresponding to the position <i, j> on the surface of the target product if it is determined that the distance value at the position <i, j> is not within the preset range.

* * * * *